US010054510B2

United States Patent
Baba et al.

(10) Patent No.: US 10,054,510 B2
(45) Date of Patent: Aug. 21, 2018

(54) METHOD OF CALIBRATING LOAD MEASUREMENT APPARATUS, LOAD MEASUREMENT SYSTEM OF WIND TURBINE BLADE, AND WIND TURBINE

(71) Applicant: MITSUBISHI HEAVY INDUSTRIES, LTD., Tokyo (JP)

(72) Inventors: Mitsuya Baba, Tokyo (JP); Wakako Ariki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 163 days.

(21) Appl. No.: 15/140,485

(22) Filed: Apr. 28, 2016

(65) Prior Publication Data

US 2017/0074743 A1  Mar. 16, 2017

(30) Foreign Application Priority Data

Sep. 11, 2015 (JP) .................. 2015-179016

(51) Int. Cl.
*G01L 25/00* (2006.01)
*G01M 5/00* (2006.01)
(Continued)

(52) U.S. Cl.
CPC .............. *G01L 25/00* (2013.01); *F03D 17/00* (2016.05); *G01B 11/165* (2013.01); *G01M 5/00* (2013.01);
(Continued)

(58) Field of Classification Search
CPC .. F03D 17/00; F03D 7/0224; F05B 2270/802; F05B 2270/808;
(Continued)

(56) References Cited

U.S. PATENT DOCUMENTS 6,571,027 B2  5/2003  Cooper et al.
7,379,169 B1  5/2008  Kraemer et al.
(Continued)

FOREIGN PATENT DOCUMENTS

CA  2714852 A1  10/2010
EP  2112376 A2  10/2009
(Continued)

OTHER PUBLICATIONS

Extended European Search Report in EP Application No. 16166971.8 dated Jan. 30, 2017.
(Continued)

*Primary Examiner* — David A Rogers
(74) *Attorney, Agent, or Firm* — Kanesaka Berner and Partners LLP

(57) ABSTRACT

A method of calibrating a load measurement apparatus for measuring a load on a wind turbine blade on the basis of strain data based on strain of a wind turbine blade includes: a strain-data acquisition step of, during a startup of a wind turbine, obtaining a plurality of the strain data for each of a plurality of conditions among which at least one of an azimuth angle or a pitch angle of the wind turbine blade is different from one another; a theoretical load-value acquisition step of obtaining a theoretical load value applied to the wind turbine blade due to own weight of the wind turbine blade, for each of the plurality of conditions, on the basis of the azimuth angle and the pitch angle of the wind turbine blade in each of the plurality of conditions; and a calibration-parameter calculation step of calculating a calibration parameter representing a relationship between the strain data obtained by the load measurement apparatus and the load on the wind turbine blade, on the basis of a correlation between each of the strain data and the theoretical load value.

16 Claims, 9 Drawing Sheets

US 10,054,510 B2
Page 2

(51) Int. Cl.
*F03D 17/00* (2016.01)
*G01B 11/16* (2006.01)

(52) U.S. Cl.
CPC ..... *F05B 2270/17* (2013.01); *F05B 2270/331* (2013.01); *F05B 2270/332* (2013.01)

(58) Field of Classification Search
CPC .......... F05B 2270/326; F05B 2270/328; F05B 2270/17; F05B 2270/331; F05B 2270/332; G01B 11/165; G01L 25/00; G01M 5/00
See application file for complete search history.

(56) References Cited

U.S. PATENT DOCUMENTS

| | | | |
|---|---|---|---|
| 7,525,209 B2 | 4/2009 | Kabatzke et al. | |
| 8,000,840 B2 | 8/2011 | Nielsen | |
| 8,232,662 B2 | 7/2012 | Baba | |
| 8,255,173 B2 * | 8/2012 | Fujioka | F03D 17/00 290/44 |
| 8,339,691 B2 | 12/2012 | Tsukamoto | |
| 8,545,179 B2 | 10/2013 | Volanthen et al. | |
| 8,576,386 B2 | 11/2013 | Jones et al. | |
| 8,610,882 B2 | 12/2013 | Roberts et al. | |
| 8,702,388 B2 * | 4/2014 | Garate Ivaro | F03D 9/002 416/1 |
| 8,814,514 B2 | 8/2014 | Olesen | |
| 9,353,727 B2 * | 5/2016 | Slot | F03D 1/065 |
| 2004/0057828 A1 * | 3/2004 | Bosche | F03D 7/0204 416/1 |
| 2007/0194574 A1 | 8/2007 | Kabatzke et al. | |
| 2008/0145007 A1 | 6/2008 | Crumpton | |
| 2009/0246019 A1 * | 10/2009 | Volanthen | F03D 80/40 416/1 |
| 2010/0004878 A1 | 1/2010 | Volanthen et al. | |
| 2010/0054935 A1 | 3/2010 | Olesen | |
| 2011/0042950 A1 | 2/2011 | Mizoue et al. | |
| 2011/0140423 A1 | 6/2011 | Menke | |
| 2011/0211200 A1 | 9/2011 | Cribbs | |
| 2011/0293418 A1 | 12/2011 | Baba | |
| 2012/0035865 A1 | 2/2012 | Fujioka et al. | |
| 2012/0104758 A1 | 5/2012 | Schietke | |
| 2013/0183151 A1 * | 7/2013 | Garate Lvaro | F03D 9/002 416/1 |
| 2013/0298634 A1 | 11/2013 | Eden | |
| 2014/0054893 A1 | 2/2014 | Lindholdt et al. | |
| 2014/0090903 A1 | 4/2014 | Kraus | |
| 2014/0178197 A1 | 6/2014 | Risager et al. | |
| 2016/0118786 A1 | 4/2016 | Zhu et al. | |

FOREIGN PATENT DOCUMENTS

| | | |
|---|---|---|
| EP | 2354538 A1 | 8/2011 |
| EP | 2607694 A1 | 6/2013 |
| EP | 2615303 A1 | 7/2013 |
| EP | 2840257 A1 | 2/2015 |
| JP | 55-29085 A | 3/1980 |
| JP | 2005-351683 A | 12/2005 |
| JP | 4951814 B2 | 6/2012 |
| JP | 5079092 B2 | 11/2012 |
| JP | 2014-500931 A | 1/2014 |
| JP | 2015-127558 A | 7/2015 |
| TW | 201126064 A1 | 8/2011 |
| WO | 2008/044074 A2 | 4/2008 |
| WO | 2009/095025 A1 | 8/2009 |
| WO | 2010/150399 A1 | 12/2010 |
| WO | 2011/058170 A1 | 5/2011 |
| WO | 2012/069631 A1 | 5/2012 |
| WO | 2010/122658 A1 | 10/2012 |
| WO | 2013/091541 A1 | 6/2013 |
| WO | 2013/091950 A1 | 6/2013 |

OTHER PUBLICATIONS

Extended European Search Report in EP Application No. 16167105.2 dated Feb. 8, 2017.
Office Action in U.S. Appl. No. 15/141,015, dated Sep. 14, 2017, 17pp.
Extended European Search Report in EP Application No. 16166967.6, dated Feb. 13, 2017.
Office Action in JP Application No. 2015-179018, dated Dec. 8, 2017. 10pp.
Office Action in JP Application No. 2015-179016, dated Nov. 7, 2017. 9pp.
Office Action in JP Application No. 2015-179017, dated Nov. 10, 2017. 7pp.
Office Action in U.S. Appl. No. 15/141,015, dated Feb. 5, 2018. 18pp.

* cited by examiner

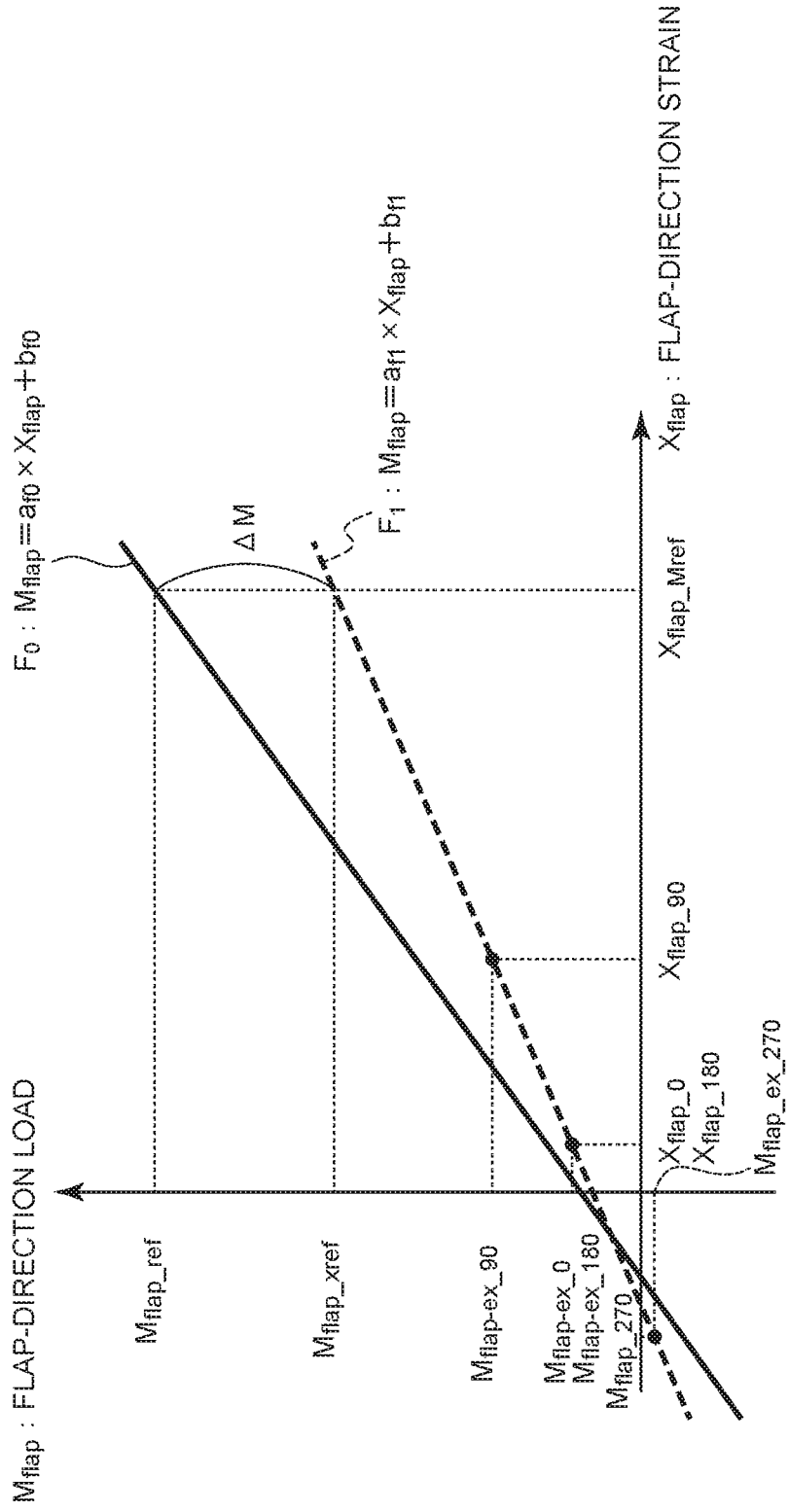

METHOD OF CALIBRATING LOAD MEASUREMENT APPARATUS, LOAD MEASUREMENT SYSTEM OF WIND TURBINE BLADE, AND WIND TURBINE

RELATED APPLICATIONS

The present application is based on, and claims priority from, Japanese Application Number 2015-179016, filed Sep. 11, 2015, the disclosure of which is hereby incorporated by reference herein in their entirety.

TECHNICAL FIELD

The present disclosure relates to a method of calibrating a load measurement apparatus for measuring a load on a wind turbine blade, a load measurement system of a wind turbine blade, and a wind turbine.

BACKGROUND ART

In a known method, a load applied to a wind turbine blade is measured on the basis of a strain of the wind turbine blade, to perform operation control for load reduction or to monitor a state of a wind turbine blade.

For instance, Patent Document 1 discloses obtaining a strain of a wind turbine blade using a sensor mounted to the wind turbine blade, and calculating a load on the wind turbine blade on the basis of a function representing a relationship between the strain and the load on a wind turbine blade.

Further, Patent Document 1 discloses calibrating the above function representing a relationship between strain and load on a wind turbine blade, on the basis of measurement data of a strain obtained by a sensor and a theoretical load in a no-wind condition calculated on the basis of a given blade weight and a pitch angle and an azimuth angle (a rotational position of the blade) of the wind turbine blade.

CITATION LIST

Patent Literature

Patent Document 1: US 2012/035865 A

SUMMARY

Normally, a function representing a correlation between strain and load on a wind turbine blade used for measuring a load on the wind turbine blade is calibrated only once during construction of a wind turbine. After operation of the wind turbine is started, a load is calculated on the basis of the above function calibrated during construction.

However, an output value of a strain sensor for detecting a strain of the wind turbine blade may become inaccurate with time, which is a phenomenon called drift. If drift of a strain sensor takes place, the strain sensor indicates an output value different from that before occurrence of drift for a load of the same magnitude. Thus, the correlation between strain and load may also change. Accordingly, if a load is calculated on the basis of the function representing a correlation between strain and load calibrated during construction of the wind turbine, there may be a great error from an actual load.

In this regard, Patent Document 1 does not mention taking into account drift of a strain sensor in measurement of a load on a wind turbine blade.

In view of this, an object of at least one embodiment of the present invention is to provide a method of calibrating a load measurement apparatus capable of reducing an influence from drift of a strain sensor.

(1) A method of calibrating a load measurement apparatus for measuring a load on a wind turbine blade on the basis of strain data based on strain of a wind turbine blade, according to at least one embodiment of the present invention, comprises: a strain-data acquisition step of, during a startup of a wind turbine, obtaining a plurality of the strain data for each of a plurality of conditions among which at least one of an azimuth angle or a pitch angle of the wind turbine blade is different from one another; a theoretical load-value acquisition step of obtaining a theoretical load value applied to the wind turbine blade due to own weight of the wind turbine blade, for each of the plurality of conditions, on the basis of the azimuth angle and the pitch angle of the wind turbine blade in each of the plurality of conditions; and a calibration-parameter calculation step of calculating a calibration parameter representing a relationship between the strain data obtained by the load measurement apparatus and the load on the wind turbine blade, on the basis of a correlation between each of the strain data and the theoretical load value.

According to the above method (1), a calibration parameter representing a relationship between strain data and a load on the wind turbine blade is calculated on the basis of strain data obtained during a startup of the wind turbine. In this way, it is possible to accurately calibrate the load measurement apparatus while reducing an influence from drift of the strain sensors, even if drift of the strain sensors occurs with time after construction of the wind turbine.

Further, since the calibration parameter is calculated on the basis of a theoretical load value acting on the wind turbine blade due to own weight of the wind turbine blade, it is desirable to obtain strain data for calibration when an aerodynamic load is as small as possible. In this regard, during a startup of the wind turbine, the rotation speed of the wind turbine rotor is relatively low and an aerodynamic load is relatively small. Further, if the wind turbine is started after the wind turbine stops due to a wind-speed decrease and then the wind speed increases again, the aerodynamic load is even smaller because the wind speed is relatively low. Thus, calculating a calibration parameter on the basis of strain data obtained during a startup of the wind turbine makes it possible to reduce an influence of an aerodynamic load and to calibrate the load measurement apparatus accurately.

(2) In some embodiments, the above method (1) further comprises a calibration step of calibrating the load measurement apparatus on the basis of at least one of a plurality of calibration parameters calculated on the basis of a plurality of sets of the strain data obtained in the strain-data acquisition step carried out in respective past multiple startups of the wind turbine.

Normally, the wind speed at a startup of the wind turbine is varied among different startups of the wind turbine, and thus strain data obtained during a startup of the wind turbine may be affected by a different aerodynamic load in each startup of the wind turbine. In this regard, according to the above method (2), the load measurement apparatus is calibrated on the basis of at least one of a plurality of calibration parameters calculated on the basis of the plurality of sets of strain data obtained during past multiple startups of the wind turbine, which makes it possible to perform load measurement of the wind turbine blade accurately.

(3) In some embodiments, in the above method (2), the calibration step comprises calibrating the load measurement apparatus by using statistic values of two or more of the plurality of calibration parameters.

According to the above method (3), the load measurement apparatus is calibrated by using two or more of the plurality of calibration parameters, which makes it possible to further improve accuracy of load measurement of the wind turbine blade.

(4) In some embodiments, in the above method (2) or (3), the calibration step comprises calculating a parameter-difference index representing a difference between at least one of the plurality of calibration parameters and a conversion calibration parameter currently used by the load measurement apparatus to convert the strain data into the load, and updating the conversion calibration parameter on the basis of at least one of the plurality of calibration parameters if the parameter-difference index exceeds an allowable range.

According to the above method (4), a parameter difference index is calculated to be compared with an allowable range, which makes it possible to determine occurrence of drift of the strain sensor from a point of time when the currently-used conversion calibration parameter is calculated to a point of time when the calibration parameter used to calculate the parameter difference index is calculated. Further, if the parameter difference index exceeds the allowable range, the conversion calibration parameter is updated on the basis of the calculated calibration parameter, which makes it possible to calibrate taking account of fluctuation of strain data due to drift of the strain sensor, which makes it possible to reduce a measurement error of a load due to drift.

(5) In some embodiments, in the above method (4), the parameter-difference index is a difference between a first load value obtained by converting a reference value of the strain data by using the conversion calibration parameter, and a second load value obtained by converting the reference value by using at least one of the plurality of calibration parameters.

As described above, with the parameter difference index being a difference between the first load value and the second load value, it is possible to directly evaluate an influence of a magnitude of an error of the conversion calibration parameter due to drift of the strain sensor on a measurement result of the load measurement apparatus. Thus, it is possible to update the conversion calibration parameter suitably when it is no longer possible to ignore an influence from drift of the strain sensor on a measurement result of the load measurement apparatus.

(6) In some embodiments, in any of the above methods (2) to (5), the calibration step comprises calibrating the load measurement apparatus by using only at least one of the plurality of calibration parameters, the at least one calibration parameter being calculated from the strain data obtained when a wind speed is at most a threshold value or when a rotation speed of a wind turbine rotor is at most a threshold value in the strain-data acquisition step.

According to the above method (6), the load measurement apparatus is calibrated by using the calibration parameter calculated from strain data obtained when the wind speed is at most a threshold value or the rotation speed of the wind turbine rotor is at most a threshold value. Specifically, the load measurement apparatus is calibrated using the calibration parameters with a reduced influence of an aerodynamic load applied to the wind turbine blade, which makes it possible to further improve accuracy of load measurement of the wind turbine blade.

(7) In some embodiments, in the above method (6), the threshold value of the wind speed is at most 80% of a rated wind speed, or the threshold value of the rotation speed of the wind turbine rotor is at most 50% of a rated rotation speed.

According to findings of the present inventors, if the wind speed is at most 80% of a rated wind speed, or the rotation speed of the wind turbine rotor is at most 50% of a rated rotation speed, calculation of a calibration parameter is less affected by an aerodynamic load applied to the wind turbine blade. Thus, according to the above method (7), the load measurement apparatus is calibrated by using only the calibration parameters with an influence of an aerodynamic load reduced to some extent, which makes it possible to further improve accuracy of load measurement of the wind turbine blade.

(8) In some embodiments, in any of the above methods (1) to (7), in the strain-data acquisition step, when a feather angle of a pitch angle of the wind turbine blade is represented as 0% and a fine angle as 100%, the strain data is obtained while the pitch angle of the wind turbine blade is within a range of from 40 to 60%.

During a startup of the wind turbine, the pitch angle of the wind turbine blade is shifted from the feather side to the fine side so that the wind turbine rotor rotates when the wind turbine blade receives wind. According to the above method (8), it is possible to obtain strain data for obtaining calibration parameters by utilizing the opportunity to shift the pitch angle of the wind turbine blade from the feather side to the fine side during a startup of the wind turbine.

Further, a load on the wind turbine blade may be measured in a flap direction and an edge direction of the wind turbine blade. An edge direction of the wind turbine blade is a cord direction connecting a leading edge and a trailing edge in a cross section orthogonal to the longitudinal direction of the wind turbine blade, and a flap direction is a direction orthogonal to the cord direction in the cross section. According to the above method (8), strain data is obtained while the pitch angle of the wind turbine blade is within a range of from 40 to 60%, which makes it possible to obtain strain data while a load due to own weight of the wind turbine blade is applied to some extent in both of the flap direction and the edge direction of the wind turbine blade. Thus, even if the load measurement apparatus has a configuration that enables measurement of a load on the wind turbine blade in the flap direction and the edge direction, it is possible to calibrate the load measurement apparatus efficiently for both of the flap direction and the edge direction.

(9) A load measurement system for a wind turbine blade according to at least one embodiment of the present invention comprises: a load measurement apparatus configured to measure a load on the wind turbine blade of a wind turbine on the basis of strain data based on strain of the wind turbine blade; and a calibration part configured to calibrate the load measurement apparatus, the calibration part comprising: a strain-data acquisition command part configured to provide the load measurement apparatus with a command to, during a startup of a wind turbine, obtain a plurality of the strain data for each of a plurality of conditions among which at least one of an azimuth angle or a pitch angle of the wind turbine blade is different from one another; a theoretical load-value acquisition part configured to obtain a theoretical load value applied to the wind turbine blade due to own weight of the wind turbine blade, for each of the plurality of conditions, on the basis of the azimuth angle and the pitch angle of the wind turbine blade in each of the plurality of conditions; and a calibration-parameter calculation part configured to calculate a calibration parameter representing a relationship between the strain data obtained by the load measurement apparatus and the load on the wind turbine blade, on the basis of a correlation between each of the strain data and the theoretical load value.

With the above configuration (9), a calibration parameter representing a relationship between strain data and a load on the wind turbine blade is calculated on the basis of strain data obtained during a startup of the wind turbine. In this way, it is possible to accurately calibrate the load measurement apparatus while reducing an influence from drift of the strain sensors, even if drift of the strain sensors occurs with time after construction of the wind turbine.

Further, since the calibration parameter is calculated on the basis of a theoretical load value acting on the wind turbine blade due to own weight of the wind turbine blade, it is desirable to obtain strain data for calibration when an aerodynamic load is as small as possible. In this regard, during a startup of the wind turbine, the rotation speed of the wind turbine rotor is relatively low and an aerodynamic load is relatively small. Further, if the wind turbine is started after the wind turbine stops due to a wind-speed decrease and then the wind speed increases again, the aerodynamic load is small because the wind speed is relatively low. Thus, calculating a calibration parameter on the basis of strain data obtained during a startup of the wind turbine makes it possible to reduce an influence of an aerodynamic load and to calibrate the load measurement apparatus accurately.

(10) In some embodiments, in the above configuration (9), the calibration part is configured to calibrate the load measurement apparatus on the basis of at least one of a plurality of calibration parameters calculated on the basis of a plurality of sets of the strain data obtained on the basis of the command of the strain-data acquisition command part in respective past multiple startups of the wind turbine.

Normally, the wind speed at a startup of the wind turbine is varied among different startups of the wind turbine, and thus strain data obtained during a startup of the wind turbine may be affected by a different aerodynamic load in each startup of the wind turbine. In this regard, with the above configuration (10), the load measurement apparatus is calibrated on the basis of at least one of the plurality of calibration parameters calculated on the basis of the plurality of sets of strain data obtained during past multiple startups of the wind turbine, which makes it possible to perform load measurement of the wind turbine blade accurately.

(11) In some embodiments, in the above configuration (9) or (10), the calibration parameter calculation part is configured to calculate the calibration parameter using only the strain data obtained when a wind speed is at most a threshold value or when a rotation speed of a wind turbine rotor is at most a threshold value, from among the plurality of strain data obtained on the basis of the command of the strain-data acquisition command part.

With the above configuration (11), the load measurement apparatus is calibrated by using the calibration parameter calculated from strain data obtained when the wind speed is at most a threshold value or the rotation speed of the wind turbine rotor is at most a threshold value. Specifically, the load measurement apparatus is calibrated using the calibration parameters with a reduced influence of an aerodynamic load applied to the wind turbine blade, which makes it possible to further improve accuracy of load measurement of the wind turbine blade.

(12) In some embodiments, in any of the above configurations (9) to (11), the load measurement apparatus includes a pair of strain sensors disposed on opposite sides of the wind turbine blade and configured to detect a strain of the wind turbine blade at respective mounting positions of the wind turbine blade, and the load measurement apparatus is configured to obtain a difference between respective detection results of the pair of strain sensors as the strain data.

With the above configuration (12), it is possible to obtain strain data of the wind turbine blade by using a pair of strain sensors mounted to the opposite sides of the wind turbine blade.

(13) In some embodiments, in the above configuration (12), the strain sensors are fiber-optic sensors each including a diffraction grating portion with a refractive index which periodically changes in a longitudinal direction, and the fiber-optic sensors are configured to detect a strain of the wind turbine blade on the basis of a wavelength of reflected light which is a light having entered the fiber-optic sensor and reflected by the diffraction grating portion.

In general, a fiber-optic sensor is less sensitive to drift than a strain gauge, and thus it is considered that an influence from drift can be ignored. However, the present inventors found that drift may occur with time even if a fiber-optic sensor is used and a load measurement result may be somewhat affected. In this regard, with the above configuration (13), in a case where a fiber-optic sensor is used as a strain sensor, the load measurement apparatus is calibrated appropriately with the configuration of the above (12), which makes it possible to reduce an error in a load measurement result due to drift of the fiber-optic sensor.

(14) A wind turbine according to at least one embodiment of the present invention comprises: a wind turbine rotor comprising a wind turbine blade; and a load measurement system of a wind turbine blade according to any one of the above (9) to (13), the load measurement system being configured to measure a load on the wind turbine blade on the basis of strain data based on strain of the wind turbine blade.

With the above configuration (14), a calibration parameter representing a relationship between strain data and a load on the wind turbine blade is calculated on the basis of strain data obtained during a startup of the wind turbine. In this way, it is possible to accurately calibrate the load measurement apparatus while reducing an influence from drift of the strain sensors, even if drift of the strain sensors occurs with time after construction of the wind turbine.

Further, since the calibration parameter is calculated on the basis of a theoretical load value acting on the wind turbine blade due to own weight of the wind turbine blade, it is desirable to obtain strain data for calibration when an aerodynamic load is as small as possible. In this regard, during a startup of the wind turbine, the rotation speed of the wind turbine rotor is relatively low and an aerodynamic load is relatively small. Further, if the wind turbine is started after the wind turbine stops due to a wind-speed decrease and then the wind speed increases again, the aerodynamic load is even smaller because the wind speed is relatively low. Thus, calculating a calibration parameter on the basis of strain data obtained during a startup of the wind turbine makes it possible to reduce an influence of an aerodynamic load and to calibrate the load measurement apparatus accurately.

According to at least one embodiment of the present invention, it is possible to provide a method of calibrating a load measurement apparatus capable of reducing an influence from drift of a strain sensor.

BRIEF DESCRIPTION OF DRAWINGS

FIG. 9 is a diagram for describing a method of calculating a parameter-difference index.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

First, a configuration of a wind turbine including a wind turbine blade, which is a measurement target of the present invention, will be described.

Figure 1:
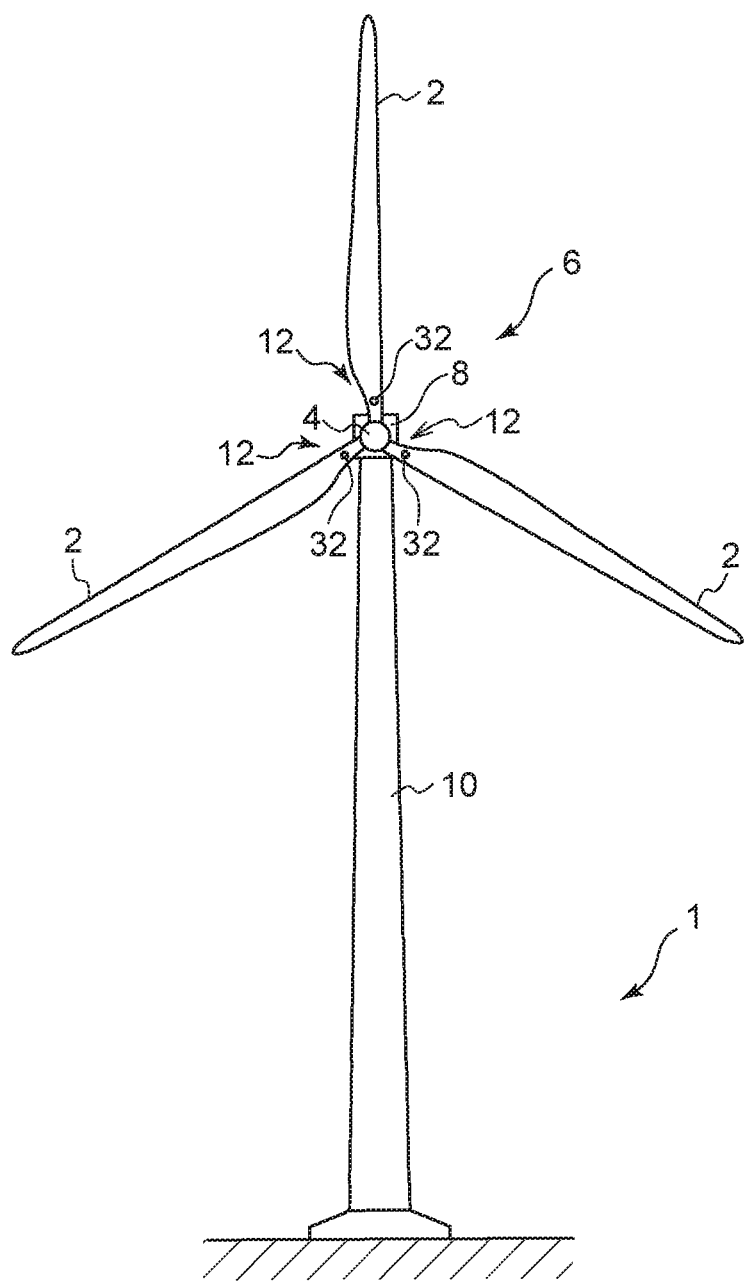
FIG. 1 is a schematic diagram of an overall configuration a wind turbine according to an embodiment.

FIG. 1 is a schematic diagram of an overall configuration of a wind turbine 1 according to an embodiment of the present invention. As illustrated in the drawing, the wind turbine 1 includes a wind turbine rotor 6 including a plurality of wind turbine blades 2 and a hub 4 to which the plurality of wind turbine blades 2 is mounted, a nacelle 8, and a tower 10 supporting the nacelle 8. In the wind turbine 1 illustrated in FIG. 1, three wind turbine blades 2 are mounted to the hub 4. In this wind turbine 1, in response to wind received by the wind turbine blades 2, the wind turbine rotor 6 including the wind turbine blades 2 and the hub 4 rotates about a rotational axis. Further, the wind turbine 1 includes a load measurement system 20 (not illustrated in FIG. 1) for measuring a load on the wind turbine blades 2.

The wind turbine 1 may be a wind turbine power generating apparatus. In this case, the nacelle 8 may house a generator and a power transmission mechanism for transmitting rotation of the wind turbine rotor 6 to the generator. The wind turbine 1 may be configured such that rotational energy of the wind turbine rotor 6 is transmitted to the generator by the power transmission mechanism to be converted into electric energy by the generator.

Figure 2:
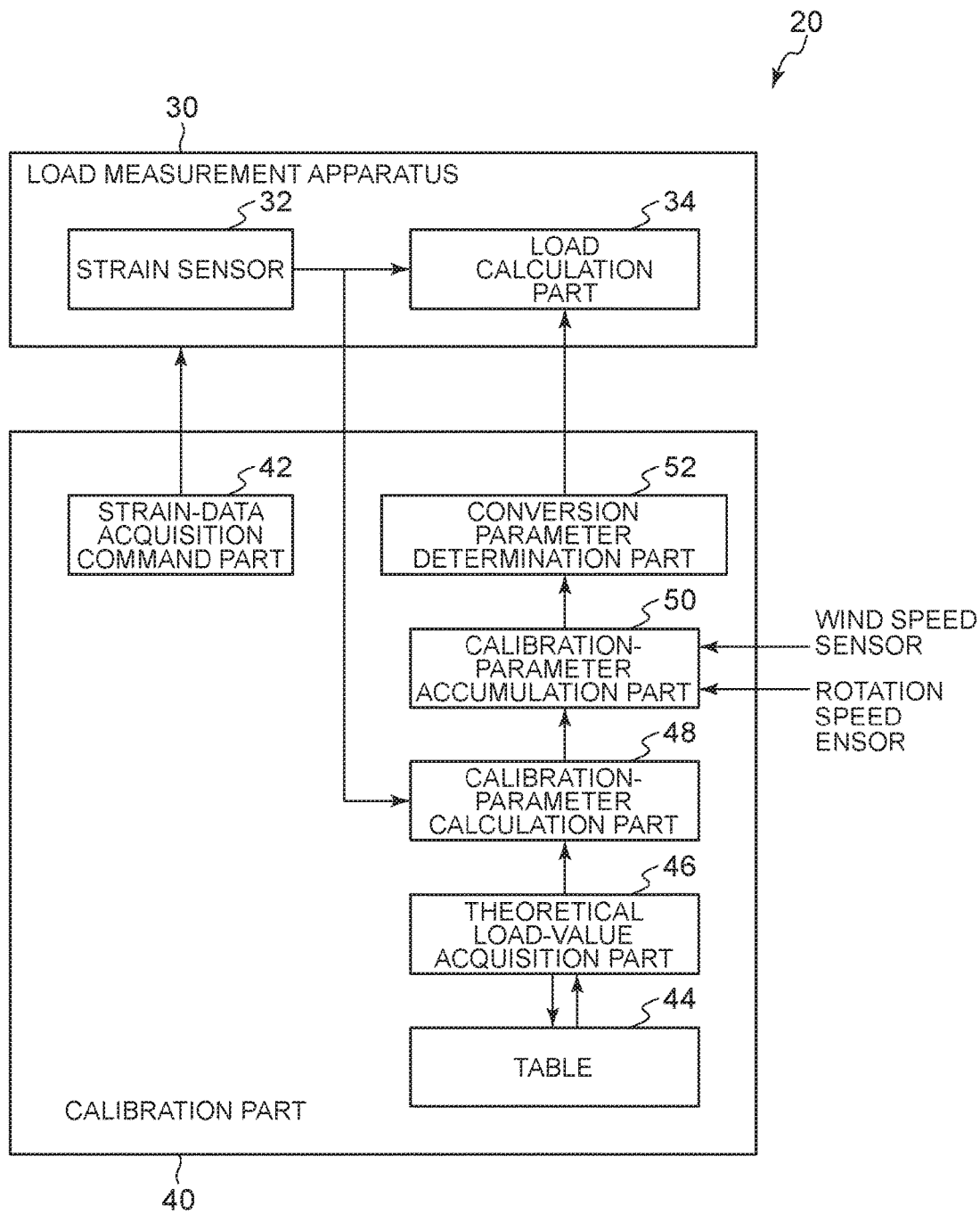
FIG. 2 is a block diagram of a schematic configuration of a load measurement system according to an embodiment.
Figure 3:
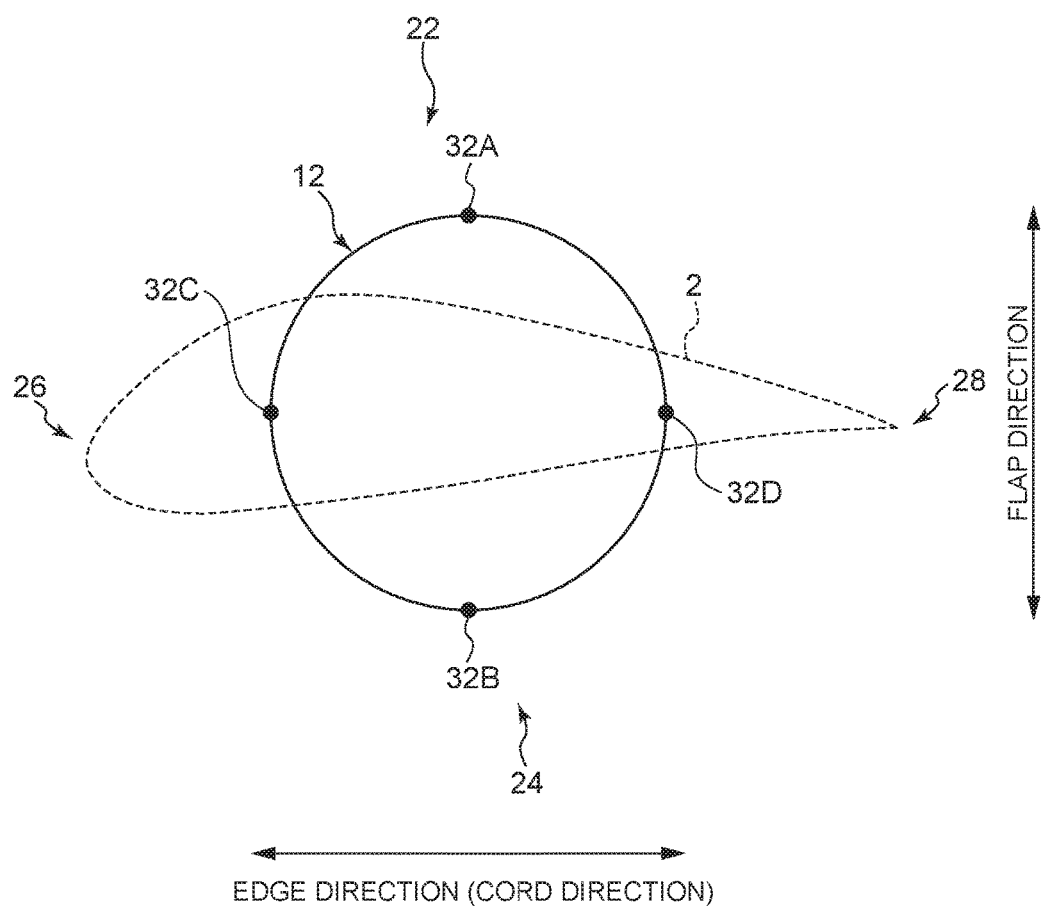
FIG. 3 is a cross-sectional view of a blade root portion of the wind turbine blade illustrated in FIG. 1, taken along a direction orthogonal to a longitudinal direction of the wind turbine blade.

Next, with reference to FIGS. 1 to 3, the configuration of the load measurement system 20 according to an embodiment will be described. FIG. 2 is a block diagram of a schematic configuration of a load measurement system according to an embodiment. FIG. 3 is a cross-sectional view of a blade root portion of the wind turbine blade illustrated in FIG. 1, taken along a direction orthogonal to a longitudinal direction of the wind turbine blade.

As illustrated in FIG. 2, the load measurement system 20 includes a load measurement apparatus 30 which measures a load on the wind turbine blades 2 on the basis of strain data based on strain of the wind turbine blades 2 and a calibration part 40 for calibrating the load measurement apparatus 30.

The load measurement apparatus 30 includes a strain sensor 32 mounted to the wind turbine blade 2 and configured to detect a strain of the wind turbine blades 2, and a load calculation part 34 for calculating a load on the wind turbine blade 2 on the basis of strain data obtained by using the strain sensor 32.

In the wind turbine 1 illustrated in FIG. 1, the strain sensor 32 is disposed on the blade root portion 12 (see FIG. 1) of each wind turbine blade 2. It should be noted that, in the wind turbine 1 illustrated in FIG. 1, the blade root portion 12 is a structural portion constituting an end portion of the wind turbine blade 2, the end portion being adjacent to the hub 4. The blade root portion 12 has a cylindrical shape and receives a bending moment transmitted to the hub 4 from the wind turbine blade 2.

Whereas all (three) of the wind turbine blades each have a strain sensor 32 disposed on the blade root portion 12, the strain sensor 32 may not be necessarily mounted to every one of the wind turbine blades 2. It is sufficient if the strain sensor 32 is mounted to each of wind turbine blades 2 which are targets of load measurement.

Now, with reference to FIG. 3, the position of the strain sensors 32 and strain data obtained by the strain sensors 32 will be described. FIG. 3 is a cross-sectional view of the blade root portion 12 of the wind turbine blade 2 illustrated in FIG. 1, taken along a direction orthogonal to a longitudinal direction of the wind turbine blade. In FIG. 3, an edge direction is a cord direction connecting a leading edge 26 and a trailing edge 28 in a cross section orthogonal to the longitudinal direction of the wind turbine blade 2, and a flap direction is a direction orthogonal to the cord direction in the cross section.

A pair of strain sensors 32A, 32B and a pair of strain sensors 32C, 32D are mounted to the blade root portion 12 of the wind turbine blade 2 illustrated in FIGS. 1 and 3. The strain sensors 32A, 32B are disposed on the opposite sides of the wind turbine blade 2 along the flap direction, and the strain sensors 32C, 32D are disposed on the opposite sides of the wind turbine blade 2 along the edge direction. Specifically, the strain sensors 32A to 32D are respectively disposed on a suction side 22, a pressure side 24, a side of the leading edge 26, and a side of the trailing edge 28, of the blade root portion 12 of the wind turbine blade 2. Strain of respective positions at which the strain sensors 32A to 32D are mounted can be obtained on the basis of measurement data measured by the above strain sensors 32A to 32D.

The strain data includes values based on strains detected by the strain sensors 32.

For instance, it is possible to calculate a strain $X_{flap}$ in the flap direction of the wind turbine blade 2 by calculating a difference between strains obtained by the strain sensors 32A, 32B mounted to the suction side 22 and the pressure side 24 of the blade root portion 12 of the wind turbine blade 2. Further, it is possible to calculate a strain $X_{edge}$ in the edge direction of the wind turbine blade 2 by calculating a difference between strains obtained by the strain sensors 32C, 32D mounted to the side of the leading edge 26 and the side of the trailing edge 28 of the blade root portion 12 of the wind turbine blade 2. The strain $X_{flap}$ in the flap direction and the strain $X_{edge}$ in the edge direction can be used as strain data.

A strain in the flap direction of the wind turbine blade 2 and a load in the flap direction have a correlation, and thus it is possible to calculate a load in the flap direction of the wind turbine blade 2 on the basis of the strain $X_{flap}$ in the flap direction of the wind turbine blade 2. Further, a strain in the edge direction of the wind turbine blade 2 and a load in the edge direction have a correlation, and thus it is possible to calculate a load in the edge direction of the wind turbine blade 2 on the basis of the strain $X_{edge}$ in the edge direction of the wind turbine blade 2.

To measure a load in the flap direction for the wind turbine blade 2, which is a target of load measurement, the wind turbine blade 2 only needs to have at least the strain sensors 32 for obtaining the strain $X_{flap}$ in the flap direction, specifically, the pair of strain sensors 32A, 32B disposed on the suction side 22 and the pressure side 24 of the wind turbine blade 2. Further, to measure a load in the edge direction for the wind turbine blade 2, which is a target of load measurement, the wind turbine blade 2 only needs to have at least the strain sensors 32 for obtaining the strain $X_{edge}$ in the edge direction, specifically, the pair of strain sensors 32A, 32B disposed on the side of the leading edge 26 and the side of the trailing edge 28 of the wind turbine blade 2.

In an embodiment, the strain sensors 32 are fiber-optic sensors including a diffraction grating portion with a refractive index that periodically changes in the longitudinal direction. The fiber-optic sensor is configured to detect a strain of the wind turbine blade 2 on the basis of the wavelength of reflected light which is a light having entered the fiber-optic sensor and reflected by the diffraction grating portion.

If a strain applied to the fiber-optic sensor changes, a grating period of the diffraction grating portion also changes. Thus, the wavelength of reflected light, which is a light having entered the optic fiber and reflected by the diffraction grating portion, changes in accordance with the change of the grating period. Accordingly, it is possible to detect a strain on the basis of the wavelength of the reflected light reflected by the diffraction grating portion.

As a fiber-optic sensor described above, a fiber Bragg grating (FBG) sensor can be used, for instance.

In an embodiment, the strain sensor 32 is a strain gauge such as a metallic strain gauge and a semiconductor strain gauge.

Whereas the strain sensors 32 are mounted to the blade root portion 12 of the wind turbine blade 2 in the embodiment illustrated in FIGS. 1 and 3, in an embodiment, the strain sensors 32 may be mounted to a tip portion (an end remote from the hub) of the wind turbine blade 2. In an embodiment, the strain sensors 32 may be mounted to a zone between the blade root portion 12 and the tip portion of the wind turbine blade 2.

Further, in an embodiment, the strain sensors 32 may be respectively disposed on the suction side 22, the pressure side 24, the side of the leading edge 26, and the side of the trailing edge 28 of the wind turbine blade 2, as illustrated in FIGS. 1 and 3. In an embodiment, a plurality of strain sensors 32 may be mounted along the longitudinal direction of the wind turbine blade 2.

The load calculation part 34 is configured to calculate a load applied to the wind turbine blade 2 for each one of the wind turbine blades 2 with the strain sensors 32 mounted thereto.

A strain of the wind turbine blade 2 and a load applied to the wind turbine blade 2 have a correlation, and thus it is possible to calculate a load on the wind turbine blade 2 on the basis of strain data obtained by the strain sensors 32 mounted to the wind turbine blade 2.

The load calculation part 34 calculates a load on the wind turbine blade 2 from strain data obtained by the strain sensors 32 on the basis of a parameter representing a correlation between strain and load on the wind turbine blade 2.

In an embodiment, a conversion calibration parameter described below is used as a parameter representing a correlation between strain and load on the wind turbine blade 2.

The calibration part 40 is configured to calibrate the load measurement apparatus 30. With the calibration part 40 calibrating the load measurement apparatus 30, it is possible to reduce an influence from drift of the strain sensors 32 and perform load measurement of a wind turbine blade accurately, even if drift of the strain sensors 32 has taken place.

As illustrated in FIG. 2, the calibration part 40 includes a strain-data acquisition command part 42, a load-value reference table 44, a theoretical load-value acquisition part 46, a calibration-parameter calculation part 48, a calibration-parameter accumulation part 50, and a conversion-parameter determination part 52.

A method of calibrating the load measurement apparatus 30 according to an embodiment is carried out by the calibration part 40 with the above configuration. A method of calibrating the load measurement apparatus 30 carried out by the calibration part 40 with the above configuration will now be described with reference to FIGS. 4 to 9.

Whereas the following description focuses on one of the wind turbine blades 2 constituting the wind turbine rotor 6 to describe a method of measuring a load on the wind turbine blade 2, a load can be measured for the other wind turbine blades 2 by the same method.

Figure 4:
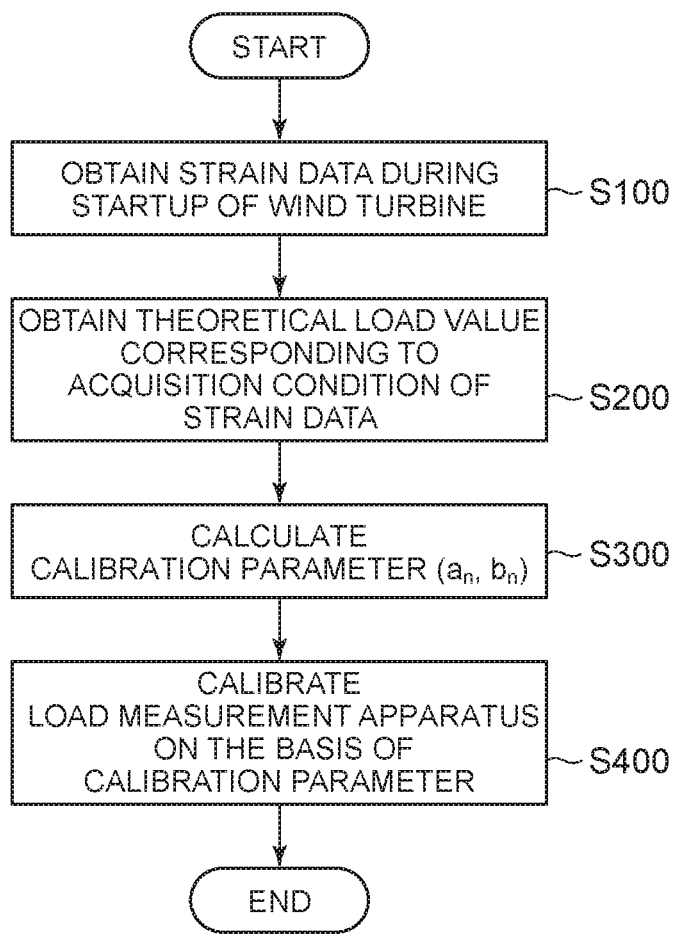
FIG. 4 is a flowchart schematically showing a method of calibrating a load measurement apparatus according to an embodiment.

FIG. 4 is a flowchart schematically showing a method of calibrating a load measurement apparatus according to an embodiment. As illustrated in the flowchart of FIG. 4, in a method of calibrating the load measurement apparatus 30 according to an embodiment, firstly, while the wind turbine 1 is being started, a plurality of strain data is obtained for each of a plurality of different conditions among which at least one of an azimuth angle or a pitch angle of the wind turbine blade 2 is different (strain-data acquisition step; S100).

Next, on the basis of the azimuth angle and the pitch angle of the wind turbine blade 2 under each of the plurality of conditions for which the strain data has been obtained in S100, a theoretical load value applied to the wind turbine blade 2 due to own weight of the wind turbine blade 2 is obtained for each of the plurality of conditions (theoretical load-value acquisition step; S200).

Next, on the basis of a correlation between each of the strain data obtained in S100 and the theoretical load value obtained in S200, a calibration parameter representing a relationship between strain data obtained by the load measurement apparatus 30 and a load on the wind turbine blade 2 is calculated (calibration-parameter calculation step; S300).

The steps S100, S200, and S300 are performed during a plurality of startups of the wind turbine 1, thereby obtaining a plurality of calibration parameters based on strain data obtained in the respective startups of the wind turbine 1.

Then, the load measurement apparatus 30 is calibrated (calibration step; S400) on the basis of at least one of the plurality of calibration parameters calculated in the calibration-parameter calculation step (S300) on the basis of the plurality of sets of strain data, each set being obtained in the strain-data acquisition step (S100) carried out in corresponding one of the past startups of the wind turbine 1.

Now, each of the above steps S100 to S400 will be described specifically. In the following description, the load measurement apparatus 30 is calibrated for load measurement in the flap direction of the wind turbine blade 2. However, the load measurement apparatus 30 can be calibrated similarly for load measurement in the edge direction of the wind turbine blade 2.

In the strain-data acquisition step (S100), the strain-data acquisition command part 42 provides the load measurement apparatus 30 with a command to obtain a plurality of strain data for each of a plurality of different conditions among which at least one of an azimuth angle or a pitch angle of the wind turbine blade 2 is different, while the wind turbine 1 is being started. In the present embodiment, the strain-data acquisition command part 42 provides the load measurement apparatus 30 with a command to obtain strain data for each of four conditions that the wind turbine blade 2 has an azimuth angle of 0°, 90°, 180°, and 270° when the pitch angle θ of the wind turbine blade 2 is a pitch angle $\theta_1$ between the full-feather position and the full-fine position, while the wind turbine 1 is being started.

Figure 6:
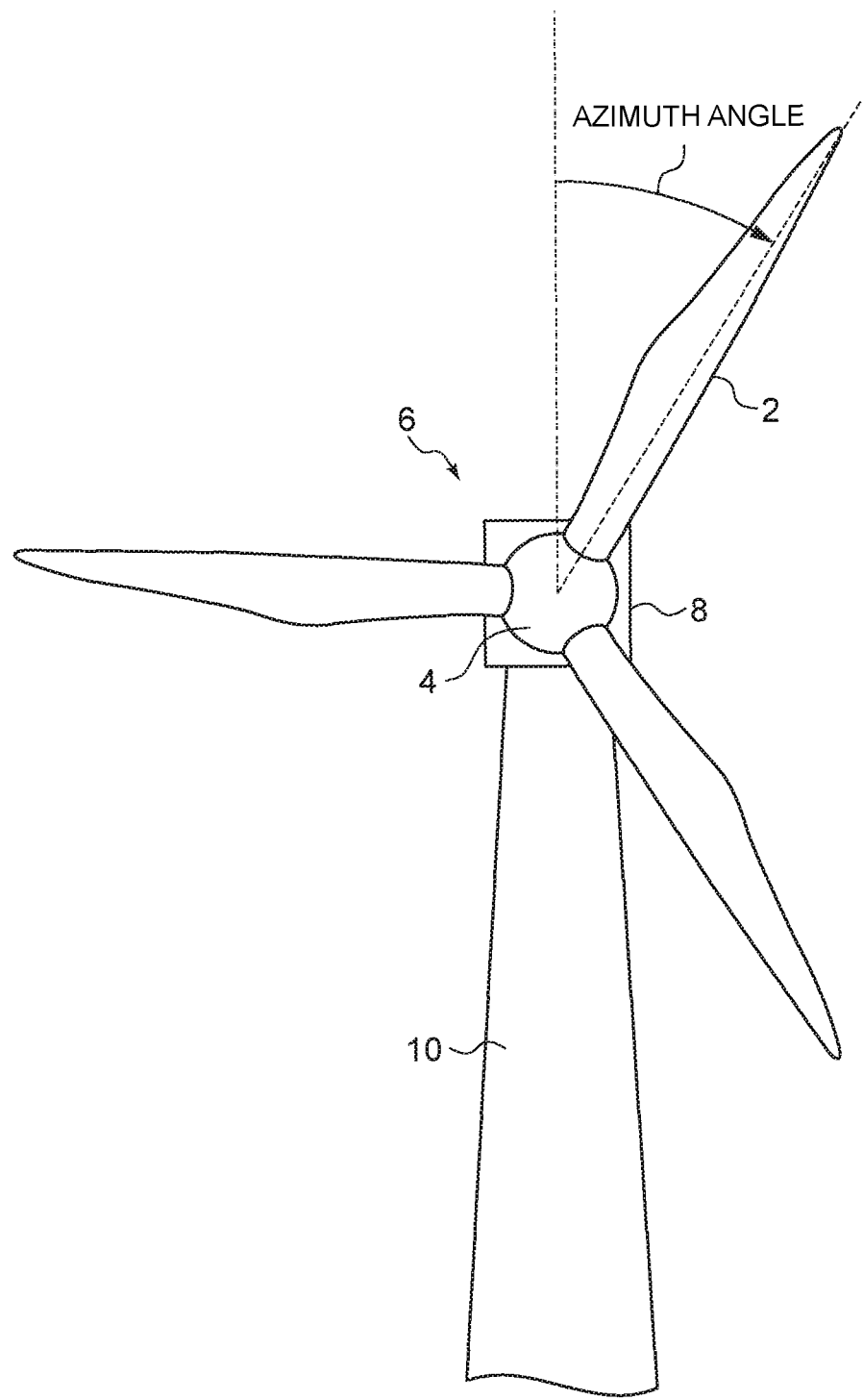
FIG. 6 is a diagram for describing an azimuth angle of a wind turbine blade according to an embodiment.

An azimuth angle is an angle formed between a predetermined reference and an axis of the wind turbine blade 2 in a rotational plane of the wind turbine blade 2, as illustrated in FIG. 6. In the present specification, the reference is the uppermost position of the wind turbine blade 2. In this case, the azimuth angle is 0° when the wind turbine blade 2 is at the uppermost position of the wind turbine blade 2, and the azimuth angle is 180° when the wind turbine blade 2 is at the lowermost position. FIG. 6 is a diagram for describing an azimuth angle of a wind turbine blade.

The load measurement apparatus 30, having received a command from the strain-data acquisition command part 42, calculates the strain $X_{flap}$ in the flap direction of the wind turbine blade 2 as strain data by calculating a difference between strains detected by the strain sensors 32A, 32B mounted to the suction side 22 and the pressure side 24 of the blade root portion 12 of the wind turbine blade 2. In this way, flap-direction strains (strain data) $X_{flap\_0}$, $X_{flap\_90}$, $X_{flap\_180}$, $X_{flap\_270}$ are obtained for the four conditions, in which the blade 2 has a pitch angle of $\theta_1$ and an azimuth angle of 0°, 90°, 180° and 270°, respectively.

Figure 7:
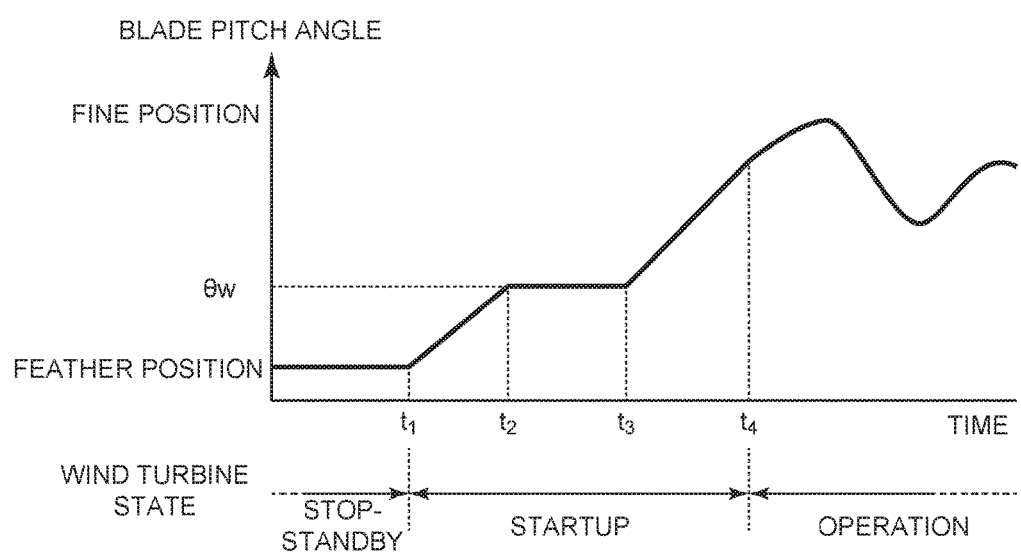
FIG. 7 is a diagram of an example of a manner of change of a pitch angle of a wind turbine blade with respect to transition of a state of a wind turbine according to an embodiment.

A state during a startup of the wind turbine 1 refers to a state in which the wind turbine 1 is in a startup state that the wind turbine 1 passes through when a stop-standby state shifts to an operating state. FIG. 7 is a diagram of an example of a manner of change of a pitch angle of a wind turbine blade corresponding to transition of a state of a wind turbine.

In the stop-standby state (a period to time $t_1$ in FIG. 7), the pitch angle of each wind turbine blade 2 of the wind turbine 1 is at a feather position, and thus the rotation speed of the wind turbine rotor 6 is substantially zero. In the startup state (a period from $t_1$ to $t_4$ in FIG. 7), the pitch angle of the wind turbine blade 2 is shifted from the feather side toward the fine side so that the wind turbine rotor 6 rotates in response to wind received by the wind turbine blade 2, thereby increasing the rotation speed of the wind turbine rotor 6. If the rotation speed of the wind turbine rotor 6 increases sufficiently in the startup state, the wind turbine 1 shifts to the operating state (a period from time $t_4$ in FIG. 7). If the wind turbine 1 is a wind turbine power generating apparatus, an operating state is a state in which the rotation speed of the wind turbine rotor 6 and the rotation speed of the generator have increased sufficiently and the wind turbine power generating apparatus is connected to the grid.

For instance, as illustrated in FIG. 7, when the pitch angle of the wind turbine blade 2 is to be shifted from a feather position to a fine position during a startup of the wind turbine 1 (i.e., while the wind turbine 1 is in the startup state), if a standby period (a period from $t_2$ to $t_3$ in FIG. 7) of standby at a constant pitch angle $\theta_w$ between the full-feather position and the full-fine position is provided, strain data of the wind turbine blade 2 may be obtained during the standby period in the strain-data acquisition step (S100).

Alternatively, during a startup of the wind turbine 1, in a stage before the pitch angle of the wind turbine blade 2 is shifted from a feather position to a fine position, the pitch angle of each of the wind turbine blades 2 may be manipulated so that only one of the wind turbine blades 2 has a pitch angle for obtaining strain data, thereby obtaining strain data for the one of the wind turbine blades 2. At this time, the pitch angles of the other two wind turbine blades 2 may be changed to the full-feather position so as to minimize an increase in the rotation speed of the wind turbine rotor 6, thereby reducing an aerodynamic load applied to the wind turbine blade 2, which is a target of strain-data acquisition, as much as possible.

In the theoretical load-value acquisition step (S200), the theoretical load-value acquisition part 46 obtains a theoretical load-value applied to the wind turbine blade 2 due to own weight of the wind turbine blade 2 from the load-value reference table 44, for the plurality of conditions under which strain data of the wind turbine blade 2 has been obtained in the strain-data acquisition step (S100).

The load-value reference table 44 is a table of a relationship of a pitch angle and an azimuth angle of the wind turbine blade 2 to a theoretical load value applied to the wind turbine blade 2 due to own weight of the wind turbine blade 2, and stores theoretical load values associated with combinations of azimuth angles and pitch angles of the wind turbine blade 2.

Specifically, the theoretical load-value acquisition part 46 refers to the load-value reference table 44 for the four conditions under which the flap-direction strains (strain data) have been obtained in the strain-data acquisition step (S100), i.e., the four conditions that the wind turbine blade 2 has a pitch angle of $\theta_1$ and an azimuth angle of 0°, 90°, 180°, and 270°, respectively, and obtains theoretical values $M_{flap\_ex\_0}$, $M_{flap\_ex\_90}$, $M_{flap\_ex\_180}$, and $M_{flap\_ex\_270}$ in the flap direction corresponding to the four conditions.

In the calibration parameter calculation step (S300), the calibration-parameter calculation part 48 calculates a calibration parameter representing a relationship between strain data obtained by the load measurement apparatus 30 and a load on the wind turbine blade 2, on the basis of a correlation between each of the flap-direction strains (strain data) obtained in the strain-data acquisition step (S100), which are $X_{flap\_0}$, $X_{flap\_90}$, $X_{flap\_180}$, and $X_{flap\_270}$, and the theoretical load values in the flap direction obtained in the theoretical load value acquisition step (S200), which are $M_{flap\_ex\_0}$, $M_{flap\_ex\_90}$, $M_{flap\_ex\_180}$, and $M_{flap\_ex\_270}$.

It is known that a correlation between a flap-direction strain $X_{flap}$ and a flap-direction load $M_{flap}$ of the wind turbine blade 2 can be approximately represented by a primary expression of $M_{flap}=aX_{flap}+b$. Thus, as a calibration parameter representing a correlation between a flap-direction strain $X_{flap}$ and a flap-direction load $M_{flap}$, it is possible to use slope "a" and/or intercept "b" in the above expression.

Figure 8:
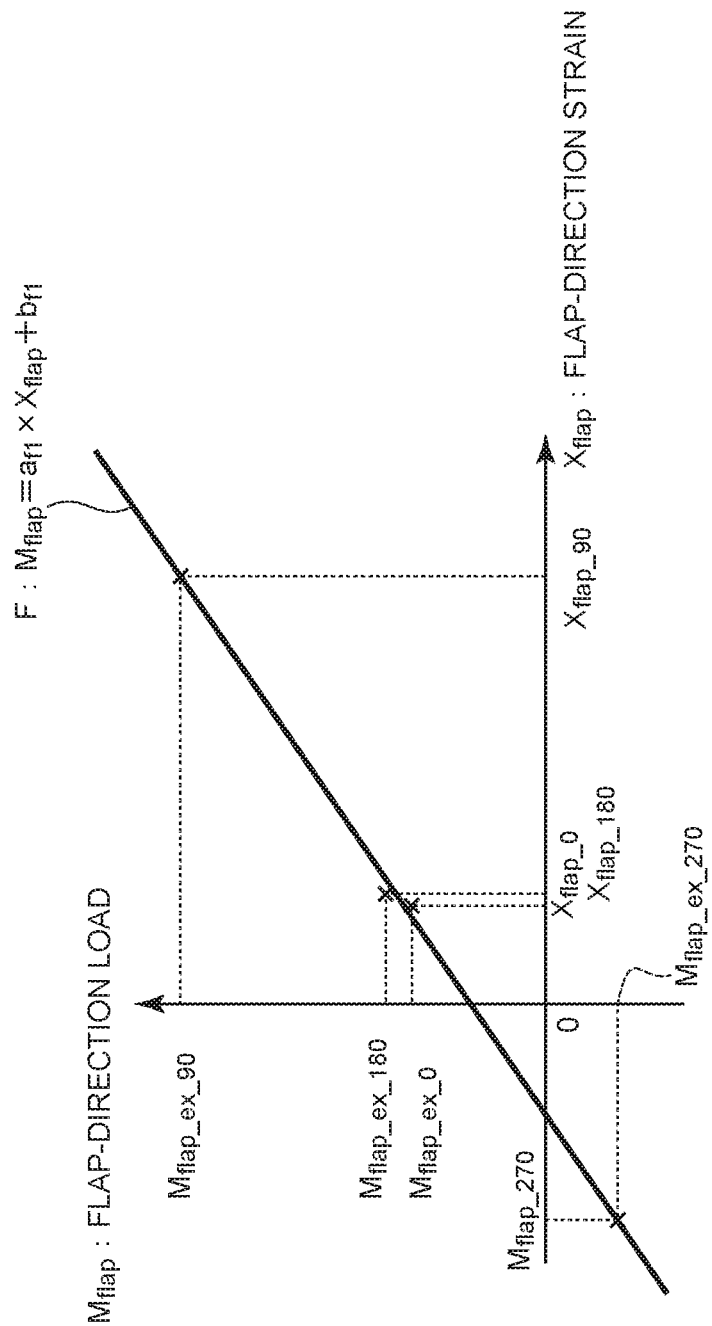
FIG. 8 is a diagram of an example of a correlation between a flap-direction strain and a flap-direction load.

FIG. 8 is a diagram of an example of a correlation between a flap-direction strain and a flap-direction load. In FIG. 8, x-axis represents a flap-direction strain $X_{flap}$ and y-axis represents a flap-direction load $M_{flap}$. On this coordinate, when the wind turbine blade 2 has a pitch angle of $\theta_1$, a correlation between a flap-direction strain and a theoretical load value is represented by an approximate line $M_{flap} = a_{f1} X_{flap} + b_{f1}$ obtained by plotting four points, $M_{flap\_ex\_0}$, $M_{flap\_ex\_90}$, $M_{flap\_ex\_180}$, and $M_{flap\_ex\_270}$, which are the theoretical load values in the flap direction obtained in the theoretical load-value acquisition step (S200) corresponding to the respective flap-direction strains (strain data) obtained in the strain data acquisition step (S100), which are $X_{flap\_0}$, $X_{flap\_90}$, $X_{flap\_180}$, and $X_{flap\_270}$.

The calibration-parameter calculation part 48 calculates an equation of the above line by the least-square method, for instance, and thereby obtains slope $a_{f1}$ and intercept $b_{f1}$, which are calibration parameters related to the flap direction of the wind turbine blade 2, of the above line.

The above described strain-data acquisition step (S100), theoretical load-value acquisition step (S200), and calibration-parameter calculation step (S300) are carried out during multiple startups of the wind turbine 1.

For instance, during a startup of the wind turbine 1, the strain-data acquisition step (S100) is carried out for the first time, and thereby flap-direction strains are obtained for respective cases in which the wind turbine blade 2 has a pitch angle of $\theta_1$ and an azimuth angle of 0°, 90°, 180°, and 270°. Then, in the theoretical load-value acquisition step (S200), theoretical load values in the flap direction are obtained, the theoretical load values corresponding to respective combinations of the pitch angle ($\theta_1$) and the azimuth angles for which the flap-direction strains have been obtained. In the calibration-parameter calculation step (S300), calibration parameters related to the flap direction of the wind turbine blade 2, which are slope $a_{f1}$ and intercept $b_{f1}$ in the expression of $M_{flap} = a_{f1} X_{flap} \ b_{f1}$, are obtained on the basis of each flap-direction strain and each flap-direction theoretical load value.

Further, in another startup of the wind turbine 1, the strain-data acquisition step (S100), the theoretical load-value acquisition step (S200), and the calibration-parameter calculation step (S300) are carried out for the second time, and calibration parameters related to the flap direction of the wind turbine blade 2, which are slope $a_{f2}$ and intercept $b_{f2}$ in an expression of $M_{flap} = a_{f2} X_{flap} + b_{f2}$, are obtained.

Similarly, in yet another startup of the wind turbine 1, the strain-data acquisition step (S100), the theoretical load-value acquisition step (S200), and the calibration-parameter calculation step (S300) are carried out for the n-th time, and calibration parameters related to the flap direction of the wind turbine blade 2, which are slope $a_{fn}$ and intercept $b_{fn}$ in an expression of $M_{flap} = a_{fn} X_{flap} + b_{fn}$, are obtained.

The calibration parameters calculated as described above ($a_{f1}$, $a_{f2}$, ... $a_{fn}$, and/or $b_{f1}$, $b_{f2}$, ... $b_{fn}$) may be accumulated in the calibration-parameter accumulation part 50. The calibration-parameter accumulation part 50 may accumulate a predetermined number (e.g. 100) of calibration parameters ($a_{f1}$ to $a_{f100}$, and/or $b_{f1}$ to $b_{f100}$). If the number of calculated calibration parameters exceeds the predetermined number, the firstly-calculated calibration parameter may be deleted and the lastly-calculated calibration member may be stored in the calibration-parameter accumulation part 50, according to the first-in-first-out (FIFO) system.

In the calibration step (S400) described below, the load measurement apparatus 30 is calibrated on the basis of at least one of the calibration parameters ($a_{f1}$, $a_{f2}$, ... $a_{fn}$, and/or $b_{f1}$, $b_{f2}$, ... $b_{fn}$) calculated on the basis of a plurality of sets of flap-direction strains (strain data) obtained in the strain-data acquisition step (S100) carried out in respective past multiple (n times) startups of the wind turbine 1.

Accordingly, as many (n) calibration parameters ($a_{f1}$ to $a_{fn}$ and/or $b_{f1}$ to $b_{fn}$) as the number of execution of strain-data acquisition step (S100) (n times), are calculated.

"The past multiple startups of the wind turbine 1" during which strain data is to be obtained are any two or more startups of the wind turbine 1, and may not be necessarily successive startups.

In an embodiment, in the strain-data acquisition step (S100), when a feather angle of a pitch angle of the wind turbine blade 2 is represented as 0% and a fine angle as 100%, the pitch angle, which is a strain-data acquisition condition of the wind turbine blade 2 for which strain-data is to be obtained, is within a range of from 40 to 60%.

As described above, during a startup of the wind turbine 1, the pitch angle of the wind turbine blade 2 is shifted from the feather side toward the fine side so that the wind turbine rotor 6 rotates in response to wind received by the wind turbine blade 2. Thus, with the pitch angle being within a range of from 40% to 60%, it is possible to obtain strain data for obtaining calibration parameters by utilizing the opportunity to shift the pitch angle of the wind turbine blade 2 from the feather side to the fine side during a startup of the wind turbine 1.

Further, if strain data is to be obtained while the pitch angle of the wind turbine blade 2 is within a range of from 40 to 60%, it is possible to obtain strain data while a load due to own weight of the wind turbine blade 2 is applied to some extent in both of the flap direction and the edge direction of the wind turbine blade 2. Thus, even if the load measurement apparatus 30 has a configuration that enables measurement of a load on the wind turbine blade 2 in the flap direction and the edge direction, it is possible to calibrate the load measurement apparatus 30 efficiently for both of the flap direction and the edge direction.

In the above description, in the strain-data acquisition step (S100), strain data is obtained under each of four conditions that the pitch angle of the wind turbine blade 2 is constant and the azimuth angle of the wind turbine blade 2 is 0°, 90°, 180°, and 270°. However, in the strain-data acquisition step, it is sufficient if strain-data is obtained for each of at least two conditions among which at least one of an azimuth angle or a pitch angle of the wind turbine blade 2 is different. If strain data is obtained under at least two conditions as described above, it is possible to obtain an approximate line representing a correlation between strain data and load on the basis of the strain data and corresponding theoretical load values, which makes is possible to calculate calibration parameters (slope and/or intercept of the approximate line).

In the strain-data acquisition step (S100), if strain data is to be obtained for each of two conditions among which at least one of an azimuth angle or a pitch angle of the wind turbine blade 2 is different from one another, it is preferable to obtain strain-data related to two conditions that the azimuth angle is 90° and 270°.

When the azimuth angle is 90° or 270°, an absolute value of a load due to own weight of the wind turbine blade 2 reaches its maximum, and the direction of the load due to own weight of the wind turbine blade 2 is opposite at an azimuth angle of 90° and 270° (i.e., a load is applied in a direction from the gravity center toward the pressure side 24 of the wind turbine blade 2 when the azimuth angle is 90°, and a load is applied in a direction from the gravity center toward the suction side 22 of the wind turbine blade 2 when the azimuth angle is 270°, for instance). Thus, it is possible to increase a difference between two sets of strain data to be obtained, and to improve accuracy of an approximate line representing a correlation between strain data and load calculated on the basis of data of two points (strain data and a corresponding theoretical load value).

Further, at a position where the pitch angle of the wind turbine blade 2 is close to the full feather position, a load due to own weight of the wind turbine blade 2 acts greatly in the flap direction and the strain sensors 32 disposed in the flap direction (i.e., on the suction side 22 and the pressure side 24 of the wind turbine blade 2) detect greater strain fluctuation, which improves accuracy of an approximate line representing a correlation between strain data and load and calibration parameters obtained in the calibration-parameter calculation step (S300). Thus, the pitch angle of the wind turbine blade 2 may be at a position in the vicinity of the full feather position when the load measurement apparatus 30 is to be calibrated in the flap direction of the wind turbine blade 2.

At a position where the pitch angle of the wind turbine blade 2 is close to the full fine position, a load due to own weight of the wind turbine blade 2 acts greatly in the edge direction and the strain sensors 32 disposed in the edge direction (i.e., on the side of the leading edge 26 and the side of the trailing edge 28) detect greater strain fluctuation, which improves accuracy of an approximate line representing a correlation between strain data and load and calibration parameters obtained in the calibration-parameter calculation step (S300). Thus, the pitch angle of the wind turbine blade 2 may be at a position in the vicinity of the full fine position when the load measurement apparatus 30 is to be calibrated in the edge direction of the wind turbine blade 2.

With the pitch angle of the wind turbine blade 2 being in the vicinity of an intermediate position of the full feather position and the full fine position, a load due to own weight of the wind turbine blade 2 acts both in the flap direction and the edge direction to some extent, which increases strain fluctuation detected by both of the strain sensors 32 disposed in the flap direction (i.e., on the suction side 22 and the pressure side 24 of the wind turbine blade 2) and the strain sensors 32 disposed in the edge direction (the side of the leading edge 26 and the side of the trailing edge 28 of the wind turbine blade 2) to some extent. Thus, both in the flap direction and the edge direction of the wind turbine blade 2, accuracy of an approximate line representing a correlation between strain data and load and calibration parameters obtained in the calibration-parameter calculation step (S300) is improved. Thus, it is possible to obtain accurate calibration parameters both in the flap direction and the edge direction in one strain measurement (a period corresponding to one revolution of the wind turbine rotor 6).

Also in the edge direction of the wind turbine blade 2, similarly to the above method described with regard to the flap direction, calibration parameters related to the edge direction of the wind turbine blade 2 can be calculated by carrying out the strain-data acquisition step (S100), the theoretical load-value acquisition step (S200), and the calibration-parameter calculation step (S300). Specifically, it is possible to calculate slope $a_e$ and intercept $b_{e1}$ in $M_{edge}=a_e X_{edge}+b_e$, which is an expression of an approximate line that represents a correlation between an edge direction load $M_{edge}$ and edge-direction strain data $X_{edge}$, on the basis of strain data representing strain in the edge direction obtained by the strain sensors 32 disposed in the edge direction (the side of the leading edge 26 and the side of the trailing edge 28 of the wind turbine blade 2).

In the calibration step (S400), the calibration part 40 calibrates the load measurement apparatus 30 on the basis of at least one of the calibration parameters ($a_{f1}$, $a_{f2}$, . . . $a_{fn}$, and/or $b_{f1}$, $b_{f2}$, . . . $b_{fn}$) calculated on the basis of a plurality of sets of flap-direction strains (strain data) obtained in the strain-data acquisition step (S100) carried out in each of past multiple (n times) startups of the wind turbine 1.

Figure 5:
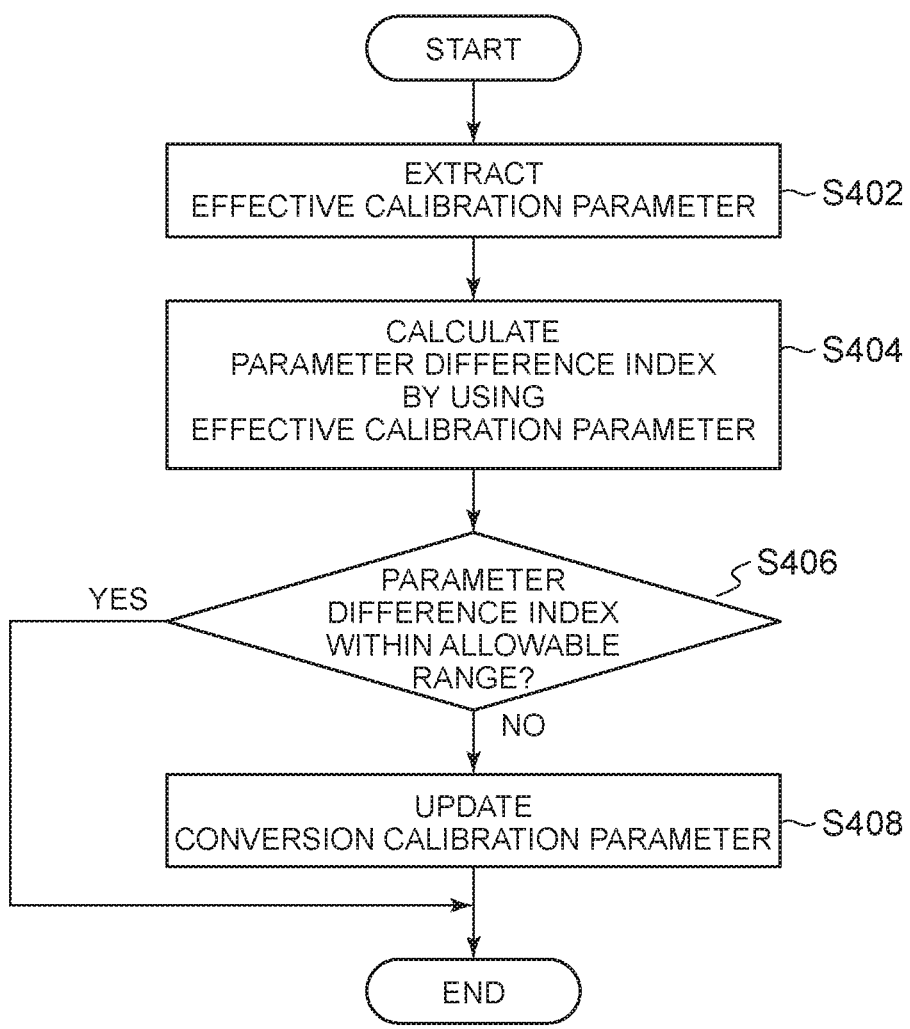
FIG. 5 is a flowchart specifically showing a calibrating step according to an embodiment.

FIG. 5 is a flowchart specifically showing the calibration step (S400) according to an embodiment.

As illustrated in FIG. 5, in the calibration step (S400), firstly, strain data based on strain obtained by the strain sensors 32 when the wind speed is not greater than a threshold value or when the rotation speed of the wind turbine rotor is not greater than a threshold value is extracted from among a plurality of sets of flap-direction strains (strain data) obtained by carrying out the strain-data acquisition step (S100) for multiple times (S402).

Next, a parameter-difference index is calculated, which represents a difference between a conversion calibration parameter currently used to convert strain data to a load by the load measurement apparatus 30 and at least one of the calibration parameters based on strain data extracted in S402 (S404).

Then, it is determined whether the parameter-difference index calculated in S404 exceeds a predetermined allowable range (S406), and if the parameter-difference index exceeds the allowable range, the conversion calibration parameter to be used by the load measurement apparatus 30 is updated on the basis of at least one of the calibration parameters based on the strain data extracted in S402 (S408).

In S402, strain data based on strains obtained by the strain sensors 32 when the wind speed is not greater than a threshold value or when the rotation speed of the wind turbine rotor 6 is not greater than a threshold value from among a plurality of flap-direction strains (strain data) obtained by carrying out the strain-data acquisition steps (S100) for multiple times is extracted.

As described above, only the strain data obtained when the wind speed or the rotation speed of the wind turbine rotor 6 is relatively low is extracted and used, which makes it possible to calculate calibration parameters with a reduced influence of an aerodynamic load applied to the wind turbine blade 2. Thus, it is possible to further improve accuracy of load measurement of the wind turbine blade 2 by calibrating the load measurement apparatus 30 using the above calibration parameters.

"When the wind speed is not greater than a threshold value" is not necessarily limited to when a momentary wind speed upon detection of a strain by the strain sensor 32 is not greater than a threshold value, and may be when a time average (e.g. average in 10 minutes) of wind speed is not greater than a threshold value, for instance. Further, "when the rotation speed of the wind turbine rotor is not greater than a threshold value" is not necessarily limited to when a momentary rotation speed upon detection of a strain by the strain sensor 32 is not greater than a threshold value, and may be when a time average (e.g. average in 10 minutes) of rotation speed is not greater than a threshold value.

The threshold value of the wind speed may be at most 80% or at most 60% of a rated wind speed. Further, the threshold value of the rotation speed of the wind turbine rotor 6 may be at most 50% or at most 35% of a rated rotation speed.

If the wind speed is at most 80% or at most 60% of a rated wind speed, or if the rotation speed of the wind turbine rotor 6 is at most 50% or 35% of a rated rotation speed, an aerodynamic load applied to the wind turbine blade 2 has a small influence on calculation of calibration parameters. Thus, the load measurement apparatus 30 is calibrated using only the calibration parameters with an influence of an aerodynamic load reduced to some extent, which makes it possible to further improve accuracy of load measurement of the wind turbine blade 2.

In S404, a parameter-difference index is calculated, which represents a difference between a conversion calibration parameter currently used to convert strain data to a load by the load measurement apparatus 30 and at least one of the calibration parameters based on strain data extracted in S402 (S404).

The parameter-difference index calculated in S404 is a difference between the first load value obtained by converting a reference value of strain data using the conversion calibration parameter currently used by the load measurement apparatus 30, and the second load value obtained by converting the reference value using at least one of the calibration parameters calculated on the basis of the strain data extracted in S402.

Now, an example of calculating a parameter-difference index will be described. FIG. 9 is a diagram for describing a method of calculating a parameter-difference index.

In FIG. 9, the expression of $F_0$: $M_{flap}=a_{f0}X_{flap}+b_{f0}$ represents a correlation of strain data and load in the flap direction on the basis of the conversion calibration parameter $(a_{f0}, b_{f0})$ currently used to convert strain data to a load by the load measurement apparatus 30. The load measurement apparatus 30 uses the above expression of $F_0$ to convert the strain data $X_{flap}$ in the flap direction obtained by the strain sensors 32 to the load $M_{flap}$ in the flap direction.

Further, in FIG. 9, the expression of $F_1$: $M_{flap}=a_{f1}X_{flap}\,b_{f1}$ represents a correlation of strain data and load in the flap direction on the basis of one of calibration parameters $(a_{f1}, b_{f1})$ based on the strain data extracted in S402.

Now, the reference value of the flap-direction strain data $X_{flap}$ is represented as $X_{flap\_ref}$. The flap-direction strain data reference value $X_{flap\_ref}$ is now a flap-direction strain that can be obtained using the conversion expression $F_0$ based on the conversion calibration parameters $(a_{f0}, b_{f0})$ currently used on a flap-direction load $M_{flap\_ref}$ of a predetermined magnitude (e.g. 5000 kNm). Specifically, the first load value is a flap-direction load $M_{flap\_ref}$ obtained by converting the flap-direction strain data reference value $X_{flap\_ref}$ by using the conversion expression $F_0$ based on the conversion calibration parameters $(a_{f0}, b_{f0})$ currently used by the load measurement apparatus 30. Further, the second load value is a flap-direction load $M_{flap\_Xref}$ obtained by converting the flap-direction strain data reference value $X_{flap\_ref}$ by using the conversion expression $F_1$ based on the calibration parameters $(a_{f1}, b_{f1})$ calculated on the basis of the strain data extracted in S402.

A difference between the first load value and the second value obtained as described above, represented by an expression of $\Delta M=|M_{flap\_ref}-M_{flap\_Xref}|$, is the parameter-difference index $I_1$.

If there are more than one calibration parameters based on the strain data extracted in S402, a parameter-difference index I may be obtained for all of the calibration parameters, or for only a part of the calibration parameters.

In S406, the parameter-difference index I calculated in S404 is compared with an allowable range. If the parameter-difference index I is greater than the allowable range (NO in S406), in the next step S408, the conversion calibration parameter is updated to convert strain data into load by the load measurement apparatus 30. In contrast, if the parameter-difference index I is within the allowable range (YES in S406), the conversion calibration parameter is not updated.

If a difference between the first load value and the second load value obtained by converting the flap-direction strain data reference value $X_{flap\_ref}$, represented by an expression of $\Delta M=|M_{flap\_ref}-M_{flap\_Xref}|$, is used as the parameter-difference index I, the allowable range to be compared with the parameter-difference index I may be a load-value range obtained by multiplying the flap-direction load $M_{flap\_ref}$ of a predetermined magnitude corresponding to the flap-direction strain data reference value $X_{flap\_ref}$ by a predetermined ratio.

For instance, if the flap-direction load $M_{flap\_ref}$ is 5000 kNm, the allowable range may be a range of from minus 500 kNm to 500 kNm, obtained by multiplying 5000 kNm by minus 10% to 10%.

In S406, each of the plurality of parameter-difference indexes I calculated in S404 is compared with the allowable range, and if a predetermined number of parameter-difference indexes I exceeds the allowable range, the conversion calibration parameter may be updated in the next step S408. For instance, if three parameter-difference indexes I recently calculated exceed the allowable range in a row, the conversion calibration parameter may be updated in the next step S408.

Further, in S406, if a parameter-difference index I exceeds the allowable range, it can be determined that drift has taken place in the strain sensor 32 having obtained the strain data from which the parameter-difference index I has been calculated. Thus, if the parameter-difference index I exceeds the allowable range, a warning alert may be issued to draw attention to occurrence of drift of the strain sensor 32.

In S408, the conversion calibration parameter currently used to convert strain data to load by the load measurement apparatus 30 is updated to a new conversion calibration parameter determined by the conversion-parameter determination part 52.

Now, "conversion calibration parameter currently used" may be those obtained in the initial calibration performed only once during installation of the wind turbine. Alternatively, "conversion calibration parameter currently used" may be determined on the basis of at least one calibration parameter obtained by carrying out the above described strain-data acquisition step (S100), theoretical load-value acquisition step (S200), and calibration-parameter calculation step (S300).

The conversion-parameter determination part 52 may calculate a new conversion calibration parameter using statistic values of two or more of the plurality of calibration parameters based on the strain data extracted in S402. For instance, the conversion-parameter determination part 52 may calculate a mean of the plurality of calibration parameters based on the strain data extracted in S402 as a new conversion calibration parameter.

The load measurement apparatus 30 with a conversion calibration parameter updated in S408 uses the updated (new) conversion calibration parameter to convert flap-direction strain data obtained by the strain sensors 32 into a load value in the flap direction.

As described above, a calibration parameter representing a relationship between strain data and load on the wind turbine blade 2 is calculated on the basis of strain data obtained during startups of the wind turbine 1, which makes it possible to accurately calibrate the load measurement apparatus 30 while reducing an influence from drift of the strain sensors 32, even if drift of the strain sensors 32 occurs with time after construction of the wind turbine 1.

Further, the load measurement apparatus 30 is calibrated on the basis of at least one of the plurality of calibration parameters calculated on the basis of the plurality of sets of strain data obtained during past multiple startups of the wind turbine 1, which makes it possible to perform load measurement of the wind turbine blade 2 accurately.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method of calibrating a load measurement apparatus for measuring a load on a wind turbine blade on the basis of strain data based on strain of a wind turbine blade, the method comprising:
   a strain-data acquisition step of, during a startup of a wind turbine, providing the load measurement apparatus with a command to obtain a plurality of the strain data for each of a plurality of conditions among which at least one of an azimuth angle or a pitch angle of the wind turbine blade is different from one another;
   a theoretical load-value acquisition step of obtaining a theoretical load value applied to the wind turbine blade due to own weight of the wind turbine blade, for each of the plurality of conditions, from a load-value reference table which stores the theoretical load value associated with the azimuth angle and the pitch angle of the wind turbine blade in each of the plurality of conditions; and
   a calibration-parameter calculation step of calculating a calibration parameter representing a relationship between the strain data obtained by the load measurement apparatus and the load on the wind turbine blade, on the basis of a correlation between each of the strain data and the theoretical load value.

2. The method of calibrating a load measurement apparatus according to claim 1, further comprising
   a calibration step of calibrating the load measurement apparatus on the basis of at least one of a plurality of calibration parameters calculated on the basis of a plurality of sets of the strain data obtained in the strain-data acquisition step carried out in respective past multiple startups of the wind turbine.

3. The method of calibrating a load measurement apparatus according to claim 2,
   the calibration step comprises calibrating the load measurement apparatus by using statistic values of two or more of the plurality of calibration parameters.

4. The method of calibrating a load measurement apparatus according to claim 2,
   wherein the calibration step comprises
      calculating a parameter-difference index representing a difference between at least one of the plurality of calibration parameters and a conversion calibration parameter currently used by the load measurement apparatus to convert the strain data into the load, and
      updating the conversion calibration parameter on the basis of at least one of the plurality of calibration parameters if the parameter-difference index exceeds an allowable range.

5. The method of calibrating a load measurement apparatus according to claim 4,
   wherein the parameter-difference index is a difference between a first load value obtained by converting a reference value of the strain data by using the conversion calibration parameter, and a second load value obtained by converting the reference value by using at least one of the plurality of calibration parameters.

6. The method of calibrating a load measurement apparatus according to claim 1, the method further comprising:
   selecting at least one calibration parameter from the plurality of calibration parameters calculated on the basis of a plurality of sets of the strain data obtained in the strain-data acquisition step carried out in respective past multiple startups of the wind turbine, the selected at least one calibration parameter being calculated from the strain data obtained when a wind speed is at most a threshold value or when a rotation speed of a wind turbine rotor is at most a threshold value in the strain-data acquisition step; and
   calibrating the load measurement apparatus using the selected at least one calibration parameter only.

7. The method of calibrating a load measurement apparatus according to claim 6,
   wherein the threshold value of the wind speed is at most 80% of a rated wind speed, or the threshold value of the rotation speed of the wind turbine rotor is at most 50% of a rated rotation speed.

8. The method of calibrating a load measurement apparatus according to claim 1,
   wherein, in the strain-data acquisition step, when a feather angle of a pitch angle of the wind turbine blade is represented as 0% and a fine angle as 100%, the strain data is obtained while the pitch angle of the wind turbine blade is within a range of from 40 to 60%.

9. The method of calibrating a load measurement apparatus according to claim 1, wherein, among the plurality of conditions, the pitch angle is the same and the azimuth angle is different from one another.

10. The method of calibrating a load measurement apparatus according to claim 1, wherein, in the strain-data acquisition step, the plurality of the strain data is obtained for each of the plurality of conditions among which the azimuth angle is different from one another during a standby period which is a part of the startup of the wind turbine, the pitch angle being kept constant at $\theta_w$ between a full-feather position and a full-fine position in the standby period.

11. A load measurement system for a wind turbine blade, comprising: a load measurement apparatus configured to measure a load on the wind turbine blade of a wind turbine on the basis of strain data based on strain of the wind turbine blade; and a calibration part configured to calibrate the load measurement apparatus, the calibration part comprising:
   a strain-data acquisition command part configured to provide the load measurement apparatus with a command to, during a startup of a wind turbine, obtain a plurality of the strain data for each of a plurality of conditions among which at least one of an azimuth angle or a pitch angle of the wind turbine blade is different from one another;

a theoretical load-value acquisition part configured to obtain a theoretical load value applied to the wind turbine blade due to own weight of the wind turbine blade, for each of the plurality of conditions, from a load-value reference table which stores the theoretical load value associated with the azimuth angle and the pitch angle of the wind turbine blade in each of the plurality of conditions; and a calibration-parameter calculation part configured to calculate a calibration parameter representing a relationship between the strain data obtained by the load measurement apparatus and the load on the wind turbine blade, on the basis of a correlation between each of the strain data and the theoretical load value.

12. The load measurement system for a wind turbine blade according to claim 11, wherein the calibration part is configured to calibrate the load measurement apparatus on the basis of at least one of a plurality of calibration parameters calculated on the basis of a plurality of sets of the strain data obtained on the basis of the command of the strain-data acquisition command part in respective past multiple startups of the wind turbine.

13. The load measurement system for a wind turbine blade according to claim 11, wherein the calibration parameter calculation part is configured to calculate the calibration parameter using only the strain data obtained when a wind speed is at most a threshold value or when a rotation speed of a wind turbine rotor is at most a threshold value, from among the plurality of strain data obtained on the basis of the command of the strain-data acquisition command part.

14. The load measurement system for a wind turbine blade according to claim 11, wherein the load measurement apparatus includes a pair of strain sensors disposed on opposite sides of the wind turbine blade and configured to detect a strain of the wind turbine blade at respective mounting positions of the wind turbine blade, the load measurement apparatus being configured to obtain a difference between respective detection results of the pair of strain sensors as the strain data.

15. The load measurement system for a wind turbine blade according to claim 14, wherein the strain sensors are fiber-optic sensors each including a diffraction grating portion with a refractive index which periodically changes in a longitudinal direction, and wherein the fiber-optic sensors are configured to detect a strain of the wind turbine blade on the basis of a wavelength of reflected light which is a light having entered the fiber-optic sensor and reflected by the diffraction grating portion.

16. A wind turbine, comprising:

a wind turbine rotor comprising a wind turbine blade; and a load measurement system of a wind turbine blade according to claim 11, the load measurement system being configured to measure a load on the wind turbine blade on the basis of strain data based on strain of the wind turbine blade.

* * * * *